US005608868A

United States Patent [19]

Simon

[11] Patent Number: 5,608,868

[45] Date of Patent: Mar. 4, 1997

[54] METHOD FOR SECURING THE DISPLAY ON A SCREEN OF MIMIC DIAGRAMS REPRESENTING THE STATUS OF A SYSTEM

[75] Inventor: François Simon, Arpajon, France

[73] Assignee: Alcatel Alsthom Compagnie Generale d'Electricite, Paris, France

[21] Appl. No.: 586,386

[22] Filed: Jan. 16, 1996

[30] Foreign Application Priority Data

Jan. 17, 1995 [FR] France .................................. 95 00453

[51] Int. Cl.[6] ........................... G01R 31/28; G06F 11/00

[52] U.S. Cl. .................................. 395/185.01; 395/183.2

[58] Field of Search ........................... 395/185.01, 185.1, 395/183.2, 183.21, 183.22; 371/67.1

[56] References Cited

U.S. PATENT DOCUMENTS

| | | | |
|---|---|---|---|
| 3,976,864 | 8/1976 | Gordon | 371/26 |
| 4,270,185 | 5/1981 | Cohen | 364/900 |
| 4,326,264 | 4/1982 | Cohen | 364/900 |
| 4,613,952 | 9/1986 | McClanahan | 364/578 |
| 5,051,996 | 9/1991 | Bergeson | 371/22.4 |
| 5,086,402 | 2/1992 | Sterling, II | 364/514 |
| 5,325,377 | 6/1994 | Tuttle | 371/67.1 |
| 5,394,447 | 2/1995 | Scarola | 376/259 |
| 5,432,805 | 7/1995 | Kikuchi | 371/53 |

FOREIGN PATENT DOCUMENTS

| | | |
|---|---|---|
| 0443377A2 | 8/1991 | European Pat. Off. . |
| 2265597 | 10/1975 | France . |
| 3411015A1 | 9/1985 | Germany . |

*Primary Examiner*—Robert W. Beausoliel, Jr.
*Assistant Examiner*—Glenn Snyder
*Attorney, Agent, or Firm*—Sughrue, Mion, Zinn, Macpeak & Seas

[57] ABSTRACT

In a method for securing the display on a screen of a workstation of mimic diagrams reflecting the status of a system connected to the workstation, a first counter is maintained in the system and a second counter is maintained in the workstation. The system periodically transmits to the workstation image data defining a mimic diagram reflecting the current status of the system, together with the first counter and a signature. In response, the workstation displays on the screen a mimic diagram based on the image data received and calculates a test value conditioned by the first and second counters, this value providing a basis for detecting a display error.

3 Claims, 1 Drawing Sheet

INFORMATION FROM TRACK EQUIPMENT
P
D C U
1 SUPER VISORY SYSTEM
2
DISPLAY MANAGER
23
24 CNTRL. PROG.
D C U
22
VIDEO MEMORY
C-ST
SCREEN
21

C
D
U
22 VIDEO MEMORY
U'
C-ST
ADD
SUBTRACT
VT TEST VALUE

METHOD FOR SECURING THE DISPLAY ON A SCREEN OF MIMIC DIAGRAMS REPRESENTING THE STATUS OF A SYSTEM

BACKGROUND OF THE INVENTION

1. Field of the Invention

The invention concerns a secured display on a screen of a workstation. The invention applies in particular to railroad interlock systems.

2. Description of the Prior Art

A railroad interlock system controls the track equipment of a rail network in accordance with operating requests sent out by a central station operator.

A railroad interlock system of this kind is usually associated with a supervisory system including a workstation with a screen for displaying the current status of the rail network in the form of mimic diagrams. These mimic diagrams are based on information sent back from sensors on the rail network under surveillance. An operator controls the operation of the railroad interlock system in accordance with the situation shown on the screen. Most importantly, the operator may on their own authority take decisions concerning the control of the track equipments of the rail network, in particular in the event of a malfunction of some of the equipment, with a view to guaranteeing correct operation of the network. In this context, the expression "securing the display" is to be understood as meaning detecting a malfunction of the display.

In a situation of this kind it is very important, since these are highly safety critical type operations, to be sure that the display of the mimic diagrams on the screen is an exact reflection of the current status of the rail network. In particular, it is necessary to be sure that the supervisory system is operating correctly. If it is not, it is important for the operator to be able to detect a malfunction of the supervisory system, including an error in the display of mimic diagrams. A display error can be caused by deterioration of the supervisory system, for example a program entering a loop and therefore monopolizing the central processor unit, or by faults in the memories used to store image data defining the mimic diagrams, or by a malfunction of the display screen itself (this list of possible causes of error is by no means exhaustive).

SUMMARY OF THE INVENTION

To this end, the invention consists in a method for securing the display on a screen of a workstation of mimic diagrams reflecting the status of a system connected to the workstation, the method including:

- maintaining a first counter in said system and maintaining a second counter in said workstation;
- periodically, in said system, incrementing said first counter, calculating a first signature from said first counter and from image data generated by said system for a current period and defining a mimic diagram reflecting the current status of said system, and transmission to said station of said image data, said first counter and said first signature;
- in said workstation, in response to the transmission of said data, storage in memory of said image data, said first counter and said first signature, display on said screen of a mimic diagram based on said image data stored in said memory, incrementing said second counter, calculating a second signature from said image data stored in said memory and said second counter, and calculating a test value from said second signature, from said first signature and from said first counter stored in memory, said test value providing a basis for detection of a display error.

Accordingly, on the basis of the test value, it is possible to detect either the absence of transmission of image data from the system under surveillance, i.e. an error in refreshing the image displayed on the screen, or an error affecting the image data held in memory in the workstation.

In accordance with the invention, the test value is written into the memory in place of the first counter so as to appear in clear embedded in the image displayed on the screen so that the operator can detect a display error merely by visual inspection.

Alternatively, the test value is transmitted to a unit external to the workstation which is adapted to detect automatically the absence of reception of this test value for a given period or irregular incrementing of this value in successive periods. In this case the display error can be indicated by an audible warning device, for example.

DETAILED DESCRIPTION OF THE PREFERRED EMBODIMENT

Figure 1:
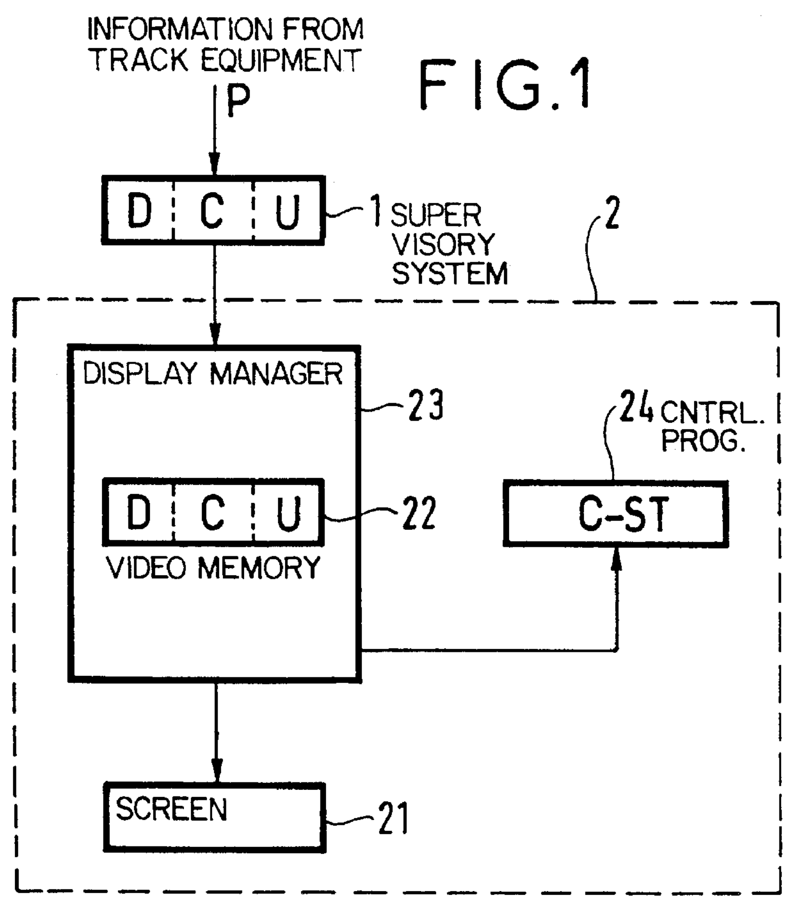
FIG. 1 is a diagram showing the architecture of a workstation for displaying mimic diagrams reflecting the status of a rail network.

Referring to FIG. 1, a supervisory system 1 that is part of a more complex railroad interlock system receives information P that is sent back from track equipments of the rail network. In the present context the supervisory system can be regarded as a computer.

The information P comprises, for example, the outputs of sensors which indicate changes occurring at a given time in the rail network. Thus the information P can indicate the presence of a train on a track section, the condition of a signal light on a track, the setting of a switch, etc.

The supervisory system 1 processes the information P to generate image data D which defines, for example, a mimic diagram that reflects the current status of the rail network.

The status of the rail network changes with time, leading to more or less frequent updating of the image data held in internal memory by the supervisory system 1.

The supervisory system 1 is connected to a workstation 2, for example a "SUN" machine, the screen 21 of which displays mimic diagrams reflecting the successive states of the rail network.

The workstation is equipped with a video memory 22 operating with the screen 21 under the control of a display manager 23 of the "XWindows" type.

In accordance with the invention, the supervisory system 1 holds in internal memory a first counter C which it increments periodically, the period in question being P. As and when changes occur in the rail network, it produces image data D; in each period P it calculates a first signature U from the current image data D and the first counter C. This first signature can be of the "bit sum" type, for example. In each period P the supervisory system 1 transmits to the workstation 2 not only the current image data D but also the first counter C and the first signature U. This amounts to the supervisory system periodically transmitting to the workstation image data "stamped" by a counter and a signature conditioned by the counter and the image data. Note that the period P is usually shorter than the pseudo-period of updating the image data D.

The stamped image data received periodically by the workstation 2 is stored temporarily in the video memory 22 which causes the display on the screen 21 of a mimic diagram based on the image data D stored in the memory 22, this mimic diagram normally reflecting the current status of the rail network in the period P concerned. In the present example the video memory also stores temporarily the first counter C and the first signature U.

Figure 2:
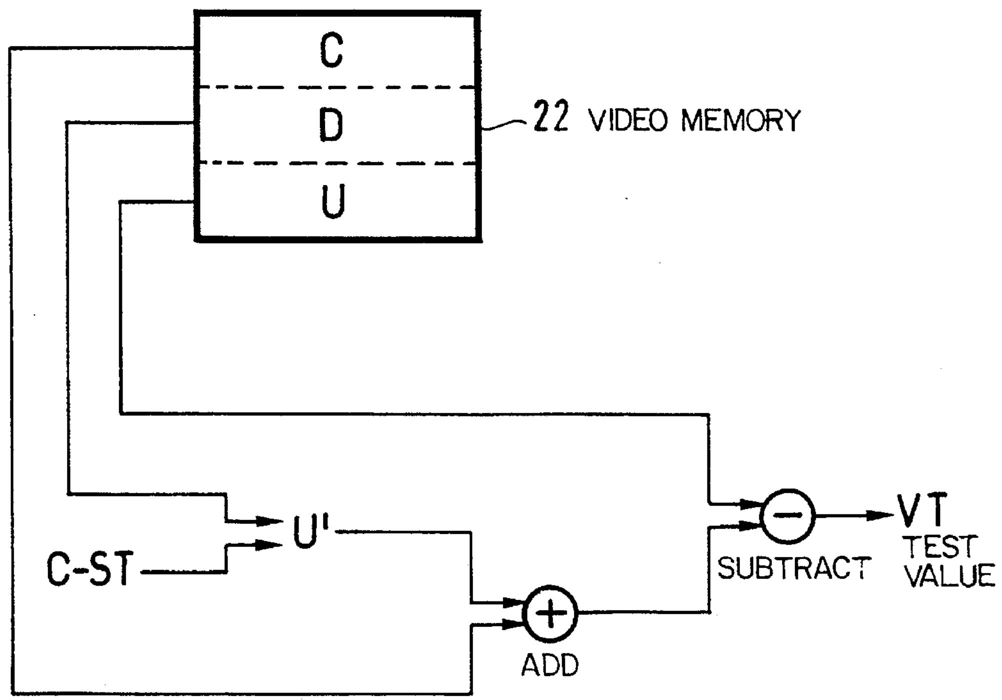
FIG. 2 is a diagram showing the method of securing the display of mimic diagrams on the screen of the workstation shown in FIG. 1.

In accordance with the invention, each operation to display a mimic diagram on the screen 21 in the manner described above is followed by a control processing operation carried out in the workstation by a dedicated program 24. As part of this control processing, a second counter C-ST is maintained in the workstation. This second counter is incremented each time a mimic diagram is displayed on the screen 21. A second signature U' is then calculated from the image data D stored in the memory 22 and the second counter C-ST as shown in FIG. 2. A test value VT is then calculated by adding to the second signature U' the value of the first counter C stored in the memory 22 and subtracting therefrom the value of the first signature U stored in the memory 22. Note that the library of the "XWindows" display manager offers a function, for example "GetImage", enabling direct reading of video memory to obtain the image data, the first counter and the first signature. When the supervisory system is initialized, the counters C and C-ST have the same value and, unless a malfunction occurs, their contents are incremented in parallel.

The test value VT is advantageously stored in the memory 22 in place of the first counter C so as to appear in clear embedded in the image displayed on the screen 21. In normal operation this test value VT is incremented in the same way as the counter C. If not, its irregular incrementation is easily detectable by the operator merely by visual inspection. An information redundancy technique can be used to detect malfunctioning of the display between the time of reading the image data in the video memory and the time at which a mimic diagram is displayed on the screen. In particular, if the image data D held in the video memory is structured in the form of objects of an object-oriented program, it is possible to duplicate the display operation for each image object.

Alternatively, the test value VT is transmitted to a unit (not shown) external to the workstation 2 which is adapted to detect the absence of reception of the test value VT in a given period P or irregular incrementing of this value in successive periods. If an anomaly is detected, the unit trips an audible alarm to indicate a display error to the operator.

The control processing carried out by the program 24 naturally increases the processing load on the workstation, especially if the period P is very short. In this case it may be advantageous to be able to inhibit the program 24. In the context of the application to a railroad interlock system, the period P of refreshing the memory 22 is reasonably in the order of 30 seconds.

The method of the invention dispenses with the need to duplicate the display screen and is therefore particularly economical. The coding function giving the first and second signatures can be adapted in accordance with reliability and performance constraints imposed by the application concerned. In the example described above, the system 1 is separate from the workstation 2 comprising a computer with graphics screen and video memory. The invention applies equally well to the situation in which the workstation computer is part of the system 1. In this case the counters C and C-ST and the signatures U and U' are managed by the same computer.

There is claimed:

1. Method for securing the display on a screen of a workstation of mimic diagrams reflecting the status of a system connected to the workstation, the method including:

maintaining a first counter in said system and maintaining a second counter in said workstation;

periodically, in said system, incrementing said first counter, calculating a first signature from said first counter and from image data generated by said system for a current period and defining a mimic diagram reflecting the current status of said system, and storing in memory said image data, said first counter and said first signature;

in said workstation, in response to the transmission of said data, storage in memory of said image data, said first counter and said first signature, displaying on said screen a mimic diagram based on said image data stored in said memory, incrementing said second counter, calculating a second signature from said image data stored in said memory and said second counter, and calculating a test value from said second signature, from said first signature and from said first counter stored in memory, said test value providing a basis for detection of a display error.

2. Method according to claim 1 wherein said test value is written in said memory in place of said first counter so as to appear visually clear, embedded in the image displayed on said screen.

3. Method according to claim 1 wherein said test value is transmitted to a unit external to said workstation adapted to detect automatically the absence of reception of said test value for a given period or irregular incrementing of said test value in successive periods.

* * * * *